United States Patent [19]

Akerberg

[11] 4,439,348

[45] Mar. 27, 1984

[54] CATALYST SYSTEM FOR FURAN RESINS

[75] Inventor: Denis W. Akerberg, Huntley, Ill.

[73] Assignee: The Quaker Oats Company, Chicago, Ill.

[21] Appl. No.: 346,353

[22] Filed: Feb. 5, 1982

Related U.S. Application Data

[63] Continuation of Ser. No. 255,586, Apr. 20, 1981, abandoned.

[51] Int. Cl.$^3$ .................. B01J 31/02; C08L 61/04
[52] U.S. Cl. .................. 252/426; 523/144; 524/492; 524/592; 524/593; 524/594; 524/612
[58] Field of Search .................. 252/426; 528/249; 525/353

[56] References Cited

U.S. PATENT DOCUMENTS

| | | | |
|---|---|---|---|
| 3,597,386 | 8/1971 | Brabander | 524/158 |
| 3,816,375 | 6/1974 | Bozer | 528/249 |
| 4,273,693 | 6/1981 | Kim | 528/249 |
| 4,317,763 | 3/1982 | Menting | 523/144 |

FOREIGN PATENT DOCUMENTS 595208  11/1947  United Kingdom .............. 526/270

*Primary Examiner*—C. A. Henderson
*Attorney, Agent, or Firm*—Karen E. Ayd

[57] ABSTRACT

A catalytic system for furan resin is disclosed, comprising mixtures of a sulfonic acid with urea salts of the respective sulfonic acid. By varying the acid:salt ratio of the catalytic system, the working time of the furan resin may be controlled as desired.

2 Claims, No Drawings

CATALYST SYSTEM FOR FURAN RESINS

This application is a continuation of application Ser. No. 255,586 filed Apr. 20, 1981, now abandoned.

The present invention relates to a chemical composition and methods useful in the catalyzing of furan resins and more particularly to a catalyst system which provides a controllable working life of the furan resin binder for use in various applications.

Furan polymers and furan resins are terms often used in referring to condensation products in which furfural or furfuryl alcohol comprises a starting monomer. Such furan resins include furfural-phenol resins, furfuryl alcohol resins, furfural-acetone resins, furfuryl alcohol-formaldehyde resins, and the like. Unless specifically identified the term furan resin will include all such resins, including all others based on the monomers of furfural and furfuryl alcohol.

In general the cure of such furan resins can be accomplished by addition of either mineral or organic acids, with the rate of cure primarily dependent upon temperature and the activity and concentration of the acid catalyst. Relatively weak acids, such as, phthalic anhydride, maleic anhydride, and phosphoric acid may be used to make homogeneous fluid systems that will show little or no increase in viscosity at room temperature yet will cure in a few hours at temperatures of 200° F.–400° F. Stronger catalysts such as sulfuric acid or p-toluene sulfonic acid can effect rapid cures at room temperatures, quickly exothermming to a peak temperature usually over 200° F.

The furan resins have found uses as foundry binders, binders in grinding wheels and coated abrasives, binders in fiberglass reinforced plastic laminated equipment, other cementing purposes and as a binder for polymer concrete. In many of the above applications it is desirable to have the capability of working with the binder system in the uncured, fluid state for an extended length of time prior to reaching a cured or, at least intractable state. For purposes of the subject invention, only those applications utilizing a resin system curable at room temperature or at least not requiring the addition of heat to the system will be considered. For instance, in the preparation of polymer concrete, sulfonic acids and acid chorides are currently used as catalysts with various inert material, such as sand and granite, used as fillers. Such catalyst systems provide for a very short working life with a rapid advance in temperature due to the exothermic reaction observed on the addition of the catalyst. Prior to the subject invention, no effective means have been available for controlling the working life of the catalyzed resin system without affecting resin strength or other properties.

SUMMARY OF THE INVENTION

Therefore, an object of the subject invention is a catalyst system for use with furan resins allowing a controlled working life of the resin.

Another object of the subject invention is a catalyst system for use with furan resins in which the length of the working life of the resin may be fully and incrementally controlled.

And still another object of the subject invention is a catalytic system for use with furan resins involving mixtures of aromatic and aliphatic sulfonic acids and their salts.

These and other objects are attained in accordance with the present invention wherein there is provided a catalytic system for use with furan resins, involving the use of aromatic and aliphatic sulfonic acids and the urea salts of such sulfonic acids in varying ratios to form a catalytic solution for a furan resin system. Control of the ratio of the sulfonic acid to the urea salt of the sulfonic acid permits the duration of the working life of the furan resin to be varied from as little as 3 minutes to over an hour at initial ambient temperatures.

Further objects of the subject invention together with additional features contributing thereto and advantages accruing therefrom will be apparent from the following description of one embodiment of the subject invention.

DESCRIPTION OF A PREFERRED EMBODIMENT

As stated above it is often desirable to obtain a longer working life of a furan resin system in a particular application. However, it is also necessary that the catalytic system for the furan resin be shelf stable for extended storage times, and in addition, that this catalytic system not affect the inherent strength of the furan resin binder for that application.

The catalytic system and method of the subject application comprises the use of mixtures of a sulfonic acid and the urea salt of that sulfonic acid in varying ratios as a means for controlling the catalytic activity and thus the working life of the resin binders. Dependent on the level of binder in the application, the working life of the resin system has been observed to increase from a three minute working life with a 100% solution of phenolsulfonic acid to over an hour with a 100% solution of the urea salt of phenolsulfonic acid.

In the preferred embodiment of the subject invention, 50% aqueous solutions of the urea salt of the sulfonic acid are utilized. As stated above, any sulfonic acid whether aromatic or aliphatic, may be used in the mixtures of the subject invention. The aromatic sulfonic acids and their salts, including phenolsulfonic acid, benzenesulfonic acid, toluenesulfonic acid, xylenesulfonic acid and their respective urea salts are among those preferred for use in the mixtures of the subject invention.

In general the urea salt of a particular sulfonic acid may be formed through the addition of urea to an aqueous solution of the sulfonic acid. More particularly, to form a 50% aqueous solution of the urea salt of, for example, phenolsulfonic acid, 57 parts of a 65% phenolsulfonic acid solution are added to 30 parts water and blended; 13 parts urea are then added to the diluted acid and blended further to form the 50% salt solution. On the addition of the urea to the aqueous phenolsulfonic acid, the following reactions are believed to take place:

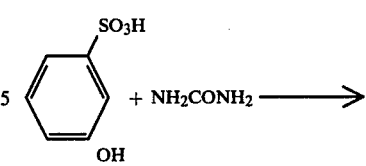

-continued

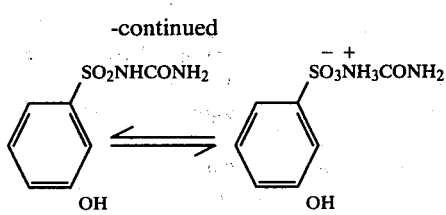

The salt solution formed as above depicted may be added to the respective acid in ratios as desired to achieve the desired catalytic activity.

To demonstrate the precise control of the catalytic activity possible with the acid/salt mixtures of the subject invention, a polymer concrete was prepared utilizing the following formulation:

EXAMPLE I

| | |
|---|---|
| 44.2 | parts Coarse Silica Aggregate |
| 17.7 | parts Intermediate Silica Aggregate |
| 26.6 | parts Silica Flour |
| 10.5 | parts Furfuryl Alcohol Resin, 10 cps |
| 1.0 | part Phenolsulfonic acid/urea salt |
| 100.00 | |

Mixtures of the catalyst system of one embodiment of the subject invention was prepared according to the ratios in the following table, and blended with the ingredients of Example I with an initial mix temperature of 77° F.–90° F., yielding the indicated working lives and peak temperatures.

TABLE I

| Parts Salt | Parts Acid | Working Life | Time to Peak Temp. | Peak Temp |
|---|---|---|---|---|
| A 0 | 1 | 3.0 min. | 12.5 min. | 223° F. |
| B 1 | 1 | 8.75 min. | 21.25 min. | 218° F. |
| C 2 | 1 | 13.75 min. | 28.75 min. | 210° F. |
| D 3 | 1 | 18.25 min. | 39.50 min. | 203° F. |
| E 4 | 1 | 20.0 min. | 42.5 min. | 200° F. |
| F 5 | 1 | 25.2 min. | 46.25 min. | 200° F. |
| G 6 | 1 | 36.25 min. | 55.0 min. | 195° F. |
| H 7 | 1 | 41.25 min. | 61.5 min. | 185° F. |
| I 8 | 1 | 49.15 min. | 66.25 min. | 190° F. |
| J 9 | 1 | 53.5 min. | 68.5 min. | 180° F. |
| K 10 | 1 | 56.25 min. | 72.5 min. | 185° F. |
| L 1 | 0 | 67.5 min. | 82.25 min. | 175° F. |

Typical compressive strengths developed from the formulation stated above range between 11 and 14,000 psi for all acid/salt ratios, from the 100% acid solution to the 100% urea salt solution.

EXAMPLE II

| | | |
|---|---|---|
| 44.8% | | Coarse Silica Aggregate |
| 17.9 | pts. | Intermediate Silica Aggregate |
| 26.8 | pts. | Silica Flour |
| 9.5 | pts. | Furfuryl Alcohol Resin, 10 cps. |
| 1.0 | pts. | Phenolsulfonic acid/urea salt |
| 100.0 | | |

The catalyst ratio of acid/urea salt catalyst system were varied as indicated below and added to the ingredients of Example II at an initial temperature of 77°–80° F., to demonstrate the affect of a higher catalyst percentage based on the binder. Typical compressive strengths developed in each formulation ranged between 11 and 14,000 psi, indicating no definable change in strength based on total catalyst percentage.

TABLE II

| Parts Salt | Parts Acid | Working Life | Time to Peak Temp. | Peak Temp. |
|---|---|---|---|---|
| M 1 | 1 | 7.5 min. | 15.0 min. | 210° F. |
| N 1 | 0 | 52.0 min. | 68.0 min. | 170° F. |

The decrease in the working life and peak temperature can be attributed to a higher concentration of the catalyst on the binder. The above data illustrates the principle that the working life of the binder system can be controlled even further by varying the catalyst/binder ratio.

While the above formulations show the use of Silicia Aggregate as an inert filler, it should be recognized that any other neutral or slightly acidic aggregate such as carbon may be utilized as well, and will depend chiefly on the application and environment in which a furan resin system is to be used. As noted previously, other fillers such as fiberglass, and the like, may also be used depending on the application.

All urea salts prepared by the teachings of the subject invention, including all acid/salt mixtures appeared shelf-stable for an extended period of time. Such solutions of the subject invention may be mixed and held in non-metallic containers, with glass containers being preferred.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A catalytic system for curing a furan polymer concrete comprising a silica aggregate, silica flour, and a furan resin wherein said catalyst system comprises a mixture of an aromatic sulfonic acid selected from the group consisting of phenolsulfonic acid, benzenesulfonic acid, toluenesulfonic acid, and xylenesulfonic acid, and urea salt of said aromatic sulfonic acid, wherein the sulfonic acid is combined with urea salt in a ratio of acid to salt from 1/1 to 1/10, thereby controlling the catalytic activity of said system for regulation of the working life of said furan polymer concrete.

2. The catalytic system of claim 1 wherein the urea salt of the aromatic sulfonic acid comprises a 50% aqueous solution of the urea salt of the sulfonic acid.

* * * * *